3,388,761
COLLAPSIBLE MOTOR CART
Paul Arpin, 1740 Almaden Road,
San Jose, Calif. 95125
Filed Mar. 21, 1966, Ser. No. 536,075
4 Claims. (Cl. 180—27)

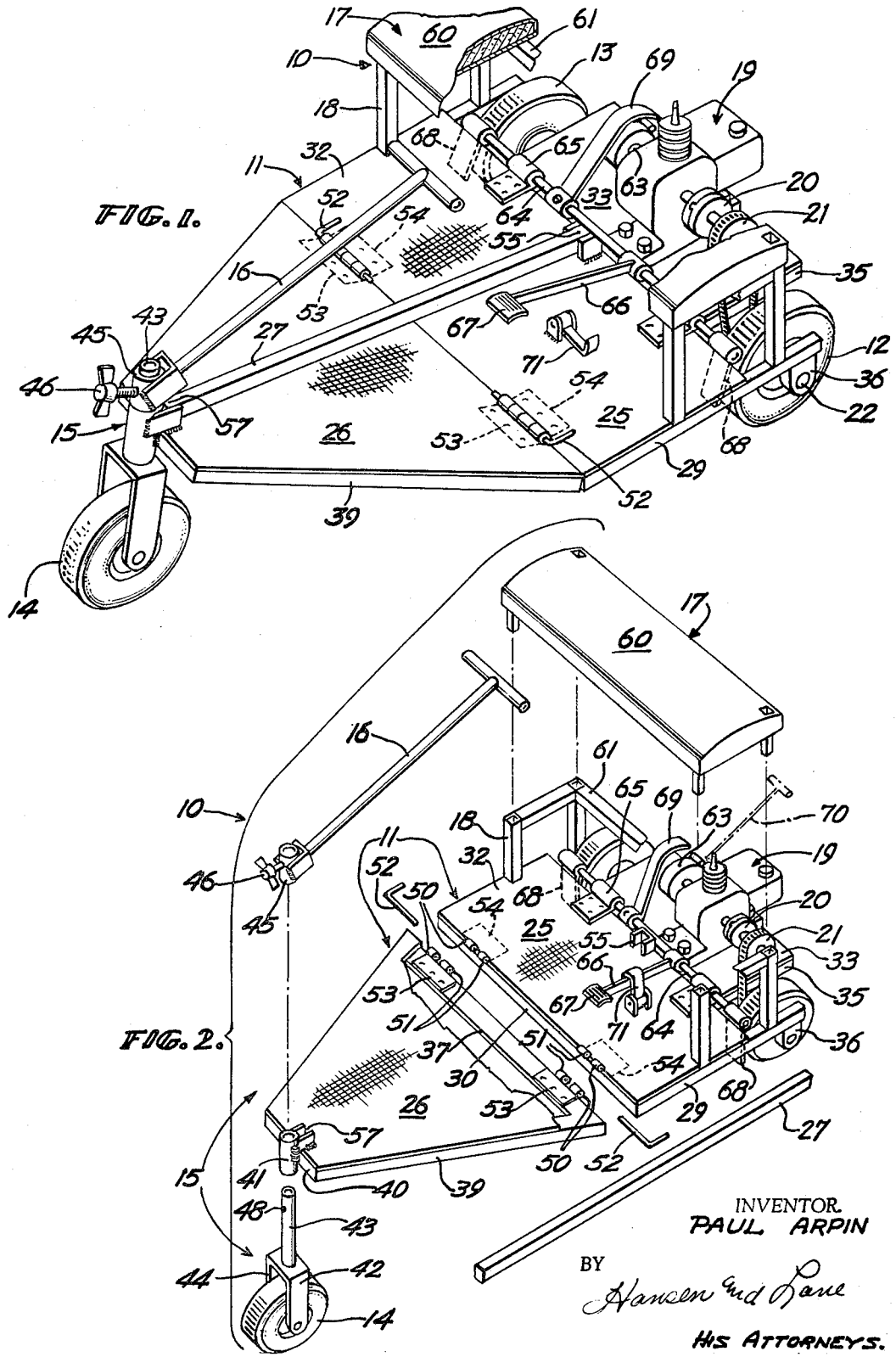

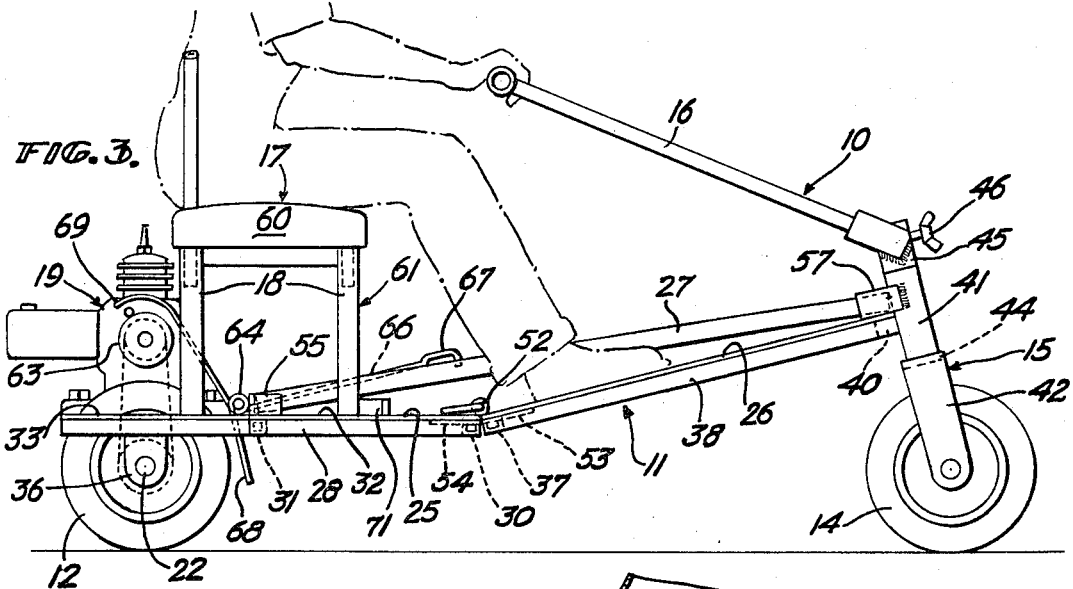
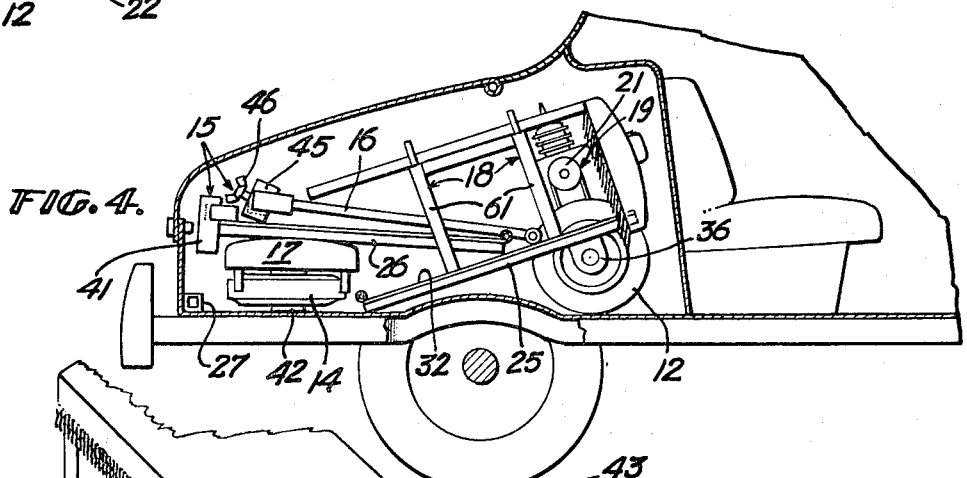
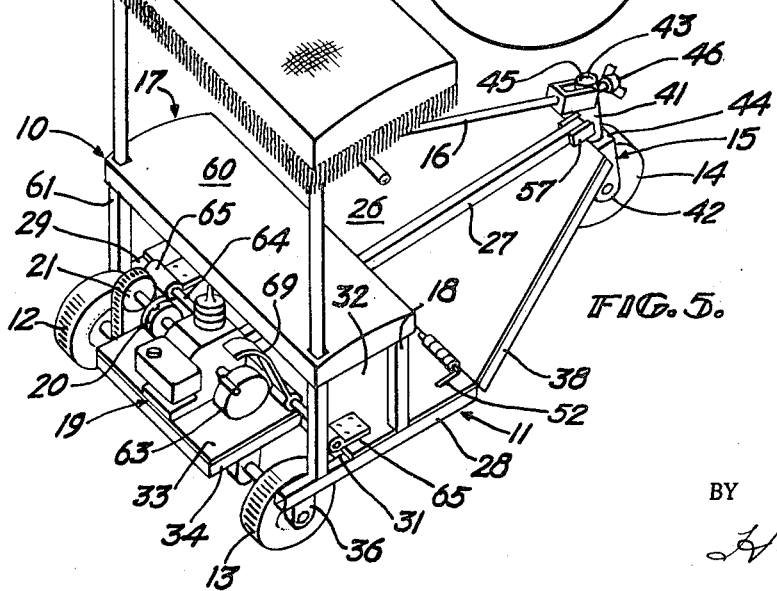

ABSTRACT OF THE DISCLOSURE

A collapsible frame for a vehicle in which a wheeled platform supporting a motor, clutch and drive as well as a seat is detachably joined to a forward wheeled steering carriage by hinge pin connections and means for limiting swinging movement between them to provide a footrest; the limiting means consisting of a strut having bearing relation between such platform and footrest.

This invention relates to motor carts and more particularly to a collapsible frame structure for such motor carts.

Motor carts have become an important mode of transportation, particularly on golf courses, board-walk and fair grounds as well as in many communities where residences are spaced around communally kept grounds and recreation areas. Such motor carts are usually constructed to accommodate two passengers and therefore are of a relatively fair size requiring a considerable area for storage. Moreover, golfers who own and operate such motor carts must either pay for their storage at the golf course or have a trailer suitable to transport the cart to their home garage. To drive such a motor cart on streets and highways is not only dangerous but would require a vehicle license similar to any other self propelled vehicle.

The present invention contemplates the provision of a motor cart which can be collapsed and/or dismantled and the parts thereof placed in a car for storage and transport. The arrangement is such that the frame of the cart comes apart in units of sub-assembly which will fit in the trunk of a conventional passenger automobile.

These and other objects of the present invention will become apparent from a reading of the following description and claims in the light of the accompanying two sheets of drawing in which:

FIG. 1 is a perspective view of a motor cart embodying the features of the present invention, parts being broken away for purpose of illustration.

FIG. 2 is an exploded perspective view of the motor cart of FIG. 1.

FIG. 3 is a side elevational view of the motor cart of FIG. 1 as seen from the side opposite to that shown in FIG. 1.

FIG. 4 is a fragmentary section through the trunk of an automobile showing the components of the disassembled motor cart of FIG. 2 arranged thereon.

FIG. 5 is a perspective view of the motor cart of FIGS. 1 and 3 from the rear right hand hand side thereof.

Referring to the drawing the motor cart 10 generally comprises a chassis 11 provided with a pair of wheels 12 and 13 at its back end and a forward wheel 14 associated with a steering device 15 including a handle 16 manipulatable by a person seated on a seat cushion 17 mounted on legs 18 at the back end of the chassis 11. A self-contained source of power 19 is mounted on the after end of the frame 11 and has driving connection via slip clutch 20 and chain and sprockets 21 with the rear axle 22 of one or both of the rear wheels 12 and 13. The arrangement is quite conventional in all golf carts and the like, the present invention residing in the collapsibility of the cart and control means therefor.

More specifically, the chassis 11 is constructed in two parts, one, 25, a platform and the other, 26, a footrest and fore mount for the steering device 15. Broadly, the invention resides in detachably connecting the platform 25 and footrest 26 together in a non-rigid fashion and providing a simple means for affixing the two parts relative to each other by the insertion of a bar or strut 27 whereby the weight of the parts as well as any load carried thereby serves to more securely affix the two parts relative to each other.

The platform 25 consists of a metal frame preferably made of square tubing. It has a pair of side members 28 and 29 joined at their fore end by a transverse tube 30. A similar tubular member 31 has its ends welded to the side members 28 and 29 approximately midway their ends to support a rectangular tread plate 32. A smaller or auxiliary platform 33 extends rearwardly from the aft tubular member 31. This aft platform has side frame members 34 and 35 parallel to the rearwardly extending portions of the side members 28 and 29, respectively, to provide therewith bifurcated arms at each aft corner of the frame for the aft wheels 12 and 13, respectively. Suitable bearing bosses 36 are provided on the bifurcated arms to support the axles for the wheels 12 and 13. The central portion of the auxiliary platform 33 supports the self-contained source of power 19 which in the present disclosure is shown to be an internal combustion engine.

The foot rest or fore portion 26 of the chassis 11 is likewise formed on a frame made of square tubing. The aft tube 37 of this frame matches the forward tubular member 30 of the platform frame. Side tubular members 38 and 39 have their ends welded to the aft tube 37 and extend in converging disposition forwardly and are welded to a shorter tubular member 40 which is parallel to the aft tube 37. A suitable tread plate matching the configuration of the frame of the footrest 26 is secured to the tubular members thereof.

The steering device 15 includes a sleeve 41 welded to the short forward tubular member 40, centrally thereof and at right angles thereto (see FIG. 3). The fore wheel 14 is mounted on an axel between the arms of a fork 42 in a conventional manner and the fork has a shaft 43 extending upwardly from its bight 44 and is dimensioned for journaled support on the sleeve 41. The upper end of the shaft 43 extends above the sleeve to receive a collar 45 having a wing headed set screw 46 threaded therethrough to secure the collar to the shaft 43. The collar 45 has a handle supporting bracket 47 secured thereto diametrically opposite the set screw 46. The bracket 47 has the handle 16 secured thereto. The shaft 43 has a beveled seat 48 formed thereon (FIG. 2) to receive the end of the set screw 46 and to secure the collar 45 to the shaft 43 in such a manner that the handle 16 will extend rearwardly.

The platform 25 and fore portion 26 of the frame 11 are detachably united by matching hinge wings 50 with a hinge pin 52. The hinge wings 50 comprise hinge halves 53 secured to the forward tubular member 30 of the platform frame and matching halves 54 secured to the aft tube 37 of the fore portion 26 of the frame 11. The barrel portions 51 of these hinge halves 53 and 54 are exposed on the upper side of the respective frame members 25 and 26 such that their upper surfaces tend to swing toward each other. This tendency of the frame members 25 and 26 to swing toward each other is resisted by the previously mentioned strut bar 27 being placed between the sleeve 41 and a stirrup 55 welded to the tubular member 31 on the upper side of the after edge of the platform 25. A similar stirrup 57 is welded to the sleeve 41 and the short forward tubular member 40, the stirrups being so disposed that the ends of the strut bar 27 is easily inserted into each of them when the hinged frame members 25 and 26 are swung toward alignment with each other. When the ends of the strut bar 27 are properly seated in the stirrups 55 and 57 and the hinged members released for support on their wheels alone, the strut bar limits swinging of the hinged members 25 and 26 beyond a desired angular relation with respect to each other.

As best seen in FIG. 3 the arrangement is such that platform 25, fore portion 26 and strut bar 27 form a triangle T in which the weight of the members 25 and 26 plus any load thereon tend to move the stirrups closer together into tight abutting relation with the ends of the strut bar 27 while the latter serves as a compressioned member resisting such movement of the stirrup toward each other.

The sides of the triangle thus formed are calculated to dispose the platform 25 in a substantially horizontal plane while the foot rest or fore portion 26 of the frame slants upwardly therefrom at an obtuse angle from the hinged edge thereof. In this disposition the entire frame 11 is supported solely upon the wheels 12, 13 and 14 for mobility of the cart 10.

The platform 25 has the seat 17 arranged on the legs 18 over the engine. The seat includes a cushion 60 removably supported on a C shaped frame 51 of square tubing includes the legs 18 which have their lower ends welded to the frame of the platform 25.

Beneath the seat 17 is a brake operating mechanism associated with the rear wheels 12 and 13 as well as the starting pulley 63 of the engine 19. This mechanism includes a cross rod 64 suitably journaled in bearings 65 attached to the aft tube 37 of the platform. A lever arm 66 secured to the rod 64 has a pedal 67 at its free end for activating the rod in a direction to set brake leaves 68, also secured to the rod, firmly against the tread of the tires on the wheels 12 and 13. The brake leaves 68 normally hang down loosely from the rod 64 thus freeing the wheels for turning under the influence of the engine 19 via the slip clutch 20. The brake leaves 68 counterweight the lever arm 66 thus raising the latter relative to the platform. The rod 64 also carries a guard 69 in the region of the starting pulley 63 and disposed to overlay the latter when the brake mechanism 62 is released. In this manner the starting pulley 63 is covered such as to prevent a person from applying the starting cord 70 to the pulley 63 when the brakes are not set.

When the brake mechanism is set by depressing the pedal 67 a latch means 71 pivotally mounted on the platform 25 is disposed to hook over the lever arm 66. This locks the brake leaves 68 firmly against the tread of the wheels 12 and 13 resisting turning thereof. The guard 69 is thus raised out of covering relation with respect to the starting pulley 63 such as to allow the cord 70 to be wound upon the pulley 63 in the usual manner for the purpose of spinning the same to start the engine. With the brakes set during starting of the engine 19, the slip clutch 20 slips and the wheels 12 and 13 do not turn. However, when a person properly seated on the cushion 60 releases the brake mechanism the wheels 12 and 13 turn to drive the cart forward.

While I have described my collapsible motor cart in specific detail it will be appreciated by those skilled in the art that the same may be susceptible to alterations, variations and/or modifications without departing from the spirit of my invention. I therefore desire to avail myself of such alterations, variations and/or modifications as may fairly come within the purview of the appended claims.

What I claim is:

1. In a motor cart of the type having a chassis supporting a self contained souce of power and provided with a pair of aft wheels at least one of which is drivingly connected to such source of power, and a steering device including a forward wheel manipulable by a person seated on a cushion mounted on the aft end of such chassis above the source of power; a collapsible frame comprising in combination:
   (a) a platform aft end,
   (b) a footrest fore end,
   (c) matching hinge barrels on the fore end of said platform and the aft end of said footrest,
   (d) a hinge pin removably inserted in said matching barrels for detachably connecting the fore end of said platform to the aft end of said footrest,
   (e) means for maintaining said footrest and said platform in a rigid condition with respect to each other, comprising:
   (f) a strut,
   (g) a stirrup on the fore end of said footrest for receiving the fore end of said strut, and
   (h) a stirrup on said platform for receiving the aft end of said strut for maintaining said strut transverse to said hinge pin and matching hinge barrels supporting the latter and for limiting swinging movement of said footrest fore end upward toward said platform aft end.

2. The device in accordance with claim 1 in which the steering device comprises:
   (a) a fork supporting the forward wheel and having a shaft extending upwardly therefrom,
   (b) a sleeve secured to the fore end of said footrest for receiving the shaft of said fork,
   (c) a collar on the core end of said handle mountable on the upper end of the shaft of said fork, and
   (d) means for securing said collar to said shaft.

3. The device in accordance with claim 2 including:
   (a) a stirrup on said sleeve adjacent the fore end of said footrest for receiving the fore end of said strut, and
   (b) a stirrup on the after end of said platform for maintaining said strut transverse to said hinge pin and midway the ends of said matching hinge barrels supporting the latter.

4. The device of claim 1 in which said platform of said frame includes:
   (a) upstanding legs secured to the aft end of said platform, and
   (b) means on said seat cushion insertable into said upstanding legs for supporting said cushion thereon.

References Cited

UNITED STATES PATENTS

| | | | |
|---|---|---|---|
| 2,696,272 | 12/1954 | Schlaphoff | 180—33 |
| 2,749,997 | 6/1956 | DeSlippe | 180—25 |
| 3,004,619 | 10/1961 | Straussler | 180—25 |
| 3,043,389 | 7/1962 | Steinberg | 180—27 |
| 3,190,676 | 6/1965 | Junge | 180—27 X |
| 3,212,596 | 10/1965 | Johnson | 296—27 X |
| 3,229,782 | 1/1966 | Hilton | 180—26 |
| 3,281,186 | 10/1966 | Davis | 180—27 X |
| 3,282,365 | 11/1966 | McReynolds | 180—27 |

KENNETH H. BETTS, *Primary Examiner.*